United States Patent [19]

Sakno

[11] Patent Number: 5,634,304
[45] Date of Patent: Jun. 3, 1997

[54] WATER IMPERVIOUS INTUMESCENT FIRESTOP COLLAPSING CONDUIT

[76] Inventor: Michael P. Sakno, 39 Denham Dr. Richmond Hill, Ontario, Canada, L4C 6H7

[21] Appl. No.: 224,498

[22] Filed: Apr. 7, 1994

[30] Foreign Application Priority Data

Dec. 15, 1993 [CA] Canada ................... 2111545

[51] Int. Cl.⁶ ................... F16L 5/04; A62C 2/06
[52] U.S. Cl. ................... 52/232; 52/1; 52/317; 52/406.1; 52/573.1; 52/DIG. 5; 285/64; 285/187; 169/48; 138/119; 428/921
[58] Field of Search ................... 52/232, 1, 317, 52/220.8, 573.1, 406.1, DIG. 5; 285/187, 196, 64; 169/48; 428/921; 137/75, 360; 138/103, 119

[56] References Cited

U.S. PATENT DOCUMENTS

| | | | |
|---|---|---|---|
| 3,087,514 | 4/1963 | Highsmith | 52/220.8 X |
| 3,934,066 | 1/1976 | Murch | 428/921 X |
| 4,086,736 | 5/1978 | Landrigan | 52/220.8 |
| 4,237,667 | 12/1980 | Pallucci et al. | 52/220.8 |
| 4,273,821 | 6/1981 | Pedlow | 428/921 X |
| 4,424,867 | 1/1984 | Mallow | 52/220.8 X |
| 4,513,173 | 4/1985 | Merry | 138/103 X |
| 4,669,759 | 6/1987 | Harbeke | 52/232 X |
| 4,676,025 | 6/1987 | Mattscheck et al. | 52/232 X |
| 4,796,401 | 1/1989 | Wexler | 52/232 |
| 4,850,385 | 7/1989 | Harbeke | 52/1 X |
| 5,032,441 | 7/1991 | Ten Eyck et al. | 428/921 X |
| 5,129,201 | 7/1992 | Robertson et al. | 52/232 |
| 5,155,957 | 10/1992 | Robertson et al. | 137/75 X |
| 5,347,767 | 9/1994 | Roth | 52/1 |
| 5,351,448 | 10/1994 | Gohlke et al. | 52/232 X |
| 5,452,551 | 9/1995 | Charland et al. | 52/232 |
| 5,466,504 | 11/1995 | Gavin et al. | 52/406.1 X |

FOREIGN PATENT DOCUMENTS

| | | | |
|---|---|---|---|
| 3607555 | 9/1987 | Germany | 169/48 |
| 2108614 | 5/1983 | United Kingdom | 285/187 |
| 2129368 | 5/1984 | United Kingdom | 428/921 |
| 2231905 | 11/1990 | United Kingdom | 169/48 |
| WO91/19540 | 12/1991 | WIPO | 169/48 |

Primary Examiner—Carl D. Friedman
Assistant Examiner—Laura A. Saladino

[57] ABSTRACT

A firestop conduit element is formed of an inner conduit of fusible material surrounded by intumescent material which is contained within an exterior moisture impenetrable barrier. A preferred barrier is an external sleeve, bonded at its ends to the conduit. The ends of the conduit element are coupleable to exterior conduit systems.

6 Claims, 5 Drawing Sheets

5,634,304

WATER IMPERVIOUS INTUMESCENT FIRESTOP COLLAPSING CONDUIT

FIELD OF THE INVENTION

This invention relates to barriers for preventing the spread of fire through openings or penetrations in the walls and floors of buildings. Such penetrations are used to route plumbing and electrical wiring. More particularly, this invention relates to a means for protecting intumescent material from infiltration of water vapor for fitting such penetrating passages that will seal-off the passage in the event of a fire.

BACKGROUND OF THE INVENTION

It is known to provide conduit for non-metallic pipes and wiring with fire-activated collars that crush the pipe when activated by heat. Such collars are generally mounted onto the conduit at the exterior end of a penetration or passage through a wall or floor. Patents that have issued that are in this category include:

| | |
|---|---|
| United States 4,916,800 | United States 4,848,043 |
| United States 4,894,966 | United States 5,103,609 |
| United States 4,788,800 | United States 4,109,423 |
| United States 4,850,385 | United States 4,307,546 |
| United States 5,129,202 | |

Generally, such devices also incorporate flanges that extend outwardly from the collar to seal-off the boundary of a wall or floor penetration into which the conduit passes. Such flanges are particularly appropriate when the penetration is larger than the conduit in diameter. They are also useful for cast-in-place conduits as a means for supporting the collar in place adjacent to the wall or floor through which the conduit passes.

Another class of device provides for conduit-collapsing means that is fitted around a conduit located within the interior of the wall or floor penetration.

Prior patents in this class include:

| | |
|---|---|
| United States 4,796,401 | United States 4,364,210 |
| United States 4,105,592 | United States 4,493,173 |
| United States 4,888,925 | |

The environment in which such devices are intended to operate requires that they have a long lifetime. Once installed at a wall or floor penetration, the expectation is that these firestop devices will last the life of the building. This could be for 25 or more years.

When installed in floor penetrations, such firestop devices are exposed to water on occasions. This can occur during the course of construction and/or in the event of mechanical failure of the piping system within a building. Even units installed on the under, ceiling-side of a floor penetration can have water drip-through from the floor above. Both wall and floor units are exposed to moisture in the air as the majority are installed within ceiling plenums.

While it has been known that some intumescent materials, such as hydrated sodium silicate and mono-ammonium phosphate are hygroscopic and need to be properly protected to prevent deterioration through the absorption of atmospheric moisture, sufficient precautions to protect intumescent materials from extended, long-time exposure to moisture have not been adequately addressed. Other intumescent materials contain water, and may benefit from provisions to prevent them from drying-out excessively.

Another feature of some existing firestop systems is that the intumescent closure device will be installed by fitting it onto the standard conduit otherwise employed at the work site as an add-on element. Such conduit is contemporaneously made of polypropylene, poly-ethylene, PVC or ABS plastic, sometimes reinforced with glass fibres. Plastics of this type are heat-softenable or "fusible", and therefore are particularly suited to being crushed by the expansion of intumescent material in the presence of heat.

It is preferable, for security of operation, to ensure that the intumescent closure components and conduit to be collapsed are matched. This cannot always be assured when the conduit is supplied on-site, separately from the firestop closure mechanism which is attached separately as an add-on element.

It is with these background considerations in mind, along with other objectives, such as ease of installation, that the invention herein has been conceived.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

In one of its broadest aspect, the invention comprises a collapsible length of conduit section of fusible material, having two ends which are coupleable to other lengths of external conduit. The collapsible conduit section is provided between its ends, with a layer of intumescent material that surrounds the outer surface of the conduit. The amount and positioning of intumescent material provided is such as will, when confined externally, collapse the conduit when the conduit is heated to a fusible temperature. This intumescent material is itself contained entirely within a water and water vapour impermeable barrier that will serve to keep the intumescent material moisture-free for a prolonged period of time.

The water and water vapour barrier (i.e. a moisture barrier) that contains the intumescent material is in the form of a totally enveloping barrier film. It may comprise the combination of the conduit itself on its inner surface, and impermeable membrane material applied on its outer surface. But as a preferred embodiment, the intumescent material is entirely sealed within a flexible sleeve of water-barrier film before it is wrapped around the conduit. A suitable film is composed of a metallized polymeric plastic such as polypropylene. In either case, an outer, surrounding expansion-containment means is required in the final installation to ensure collapse of the fuseable conduit section under pressure from the expanding intumescent. This may be provided in the known manner by encasing the intumescent material inside a metal sleeve where the conduit is to be exposed. Alternately, when the conduit section is to be cast in place, the surrounding concrete will serve as the containment means.

Another preferred suitable external moisture barrier is an exterior sleeve that encases the usual intumescent material in a hermetically sealed manner. Though not necessarily of such a strength when the conduit assembly is cast-in-place, the exterior sleeve is preferably sufficiently strong to contain the expansion of the intumescent material and focus its expansion on collapsing the conduit without reliance upon containment by surrounding concrete. The ends of such sleeve should be sealed, as in the case of a plastic sleeve by heat or welding solvent gluing, to the conduit in order to provide a hermetic seal.

The coupleable ends of the conduit section may be simple, straight ends that serve as the male component in a male-female coupling. Or they may be shaped to provide the female component of such a coupling; or a combination of each type.

In a preferred variant of the invention, the ends of the conduit section are enlarged at collars that provide female couplings. The intumescent material is applied around the intervening length of conduit between the two enlarged ends. The outside diameter of the intumescent material is arranged to be less than the diameter of such collars. The water impermeable barrier is then provided by an outer non-expandable sleeve of water impenetrable material that surrounds the intumescent material and is sealed at its ends to the respective collars located at the ends of the conduit length.

This sealing of the outer sleeve with the collars may be effected as by the use of "O" rings, by use of a compatible adhesive, or preferably by heat or solvent welding.

A variant form for such a sleeve is a composite structure wherein an inner, thin-walled sleeve of bondable impermeable weldable material, compatible for bonding to the collars, is surrounded by an outer, non-expandable sleeve, preferably of a heat-conducting metal such as galvanized sheet iron. The ends of the impermeable sleeve are bonded as by welding or adhesive to the ends of the conduit section. The water impermeability of the combination is provided by the inner sleeve; and the strength to confine the intumescent material is provided by the outer sleeve.

As a further variant, the outside surface of the outer sleeve may be threaded to permit the attachment of an exterior end-flange for mounting against the outside periphery of a wall or floor penetration. Such a threaded formation may be cast into a plastic sleeve or may be roll-formed in a metal sleeve and held in place by attachment to the collars, or inner sleeve used on conduit of that variant.

The firestop conduit of the invention is intended to be installed as a unit in the penetrations through which wiring is intended to pass. It is also suited to use in combination with plumbing wherein the firestop conduit forms a portion of the plumbing system. When not cast-in-place, the conduit may be positioned within the penetration by the use of an exterior flange; or by conventional packing placed between the conduit and the inner sides of the penetration.

When the conduit has been installed in a penetration, it may unintentionally be positioned slightly out of alignment with the external conduit to which it is intended to connect. Such misalignment may be accommodated by another feature of the invention in the form of an off-set coupling adaptor. Such off-set adaptor is provided with ends for coupling, on one side to an end of the firestop conduit, and on the other side to the end of exterior conduit which is off-set. The path of the opening that flows from the firestop conduit, through the off-set adaptor to the exterior conduit is, therefore, "S" shaped. With circular coupling surfaces, this "S"-shaped off-set adaptor may be swung in a path which is concentric with the centre of the firestop conduit. The range of positions that the other end of the adaptor may thereby occupy can provide a means to correct for at least some degree of misalignment that may exist.

By use of a flange extension that allows a coupleable end of a firestop conduit of the invention to be inset from the surface against which the flange is mounted, the off-set can be made short enough to fit between the flange and conduit end. This allows the entire correctional element to be positioned within the wall or floor thickness that is being penetrated.

As a further preferred variant of the invention, the inner conduit, outer sleeve and flange may all be molded together as one monolithic element. Such molded part provides an annular space that may be filled with intumescent material through an opening located at one end, opposite the flange. Once this space has been filled, the opening may be closed with caulking or by an annular cap that is hermetically sealed in place.

In such a variant, the inner conduit is intended to soften under the heat of hot gasses passing therethrough, triggering the intumescent material to expand. The molded outer sleeve is of a thickness that, combined with its spacing from the hot gases, renders it non-expandable to confine the intumescent material at it expands.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
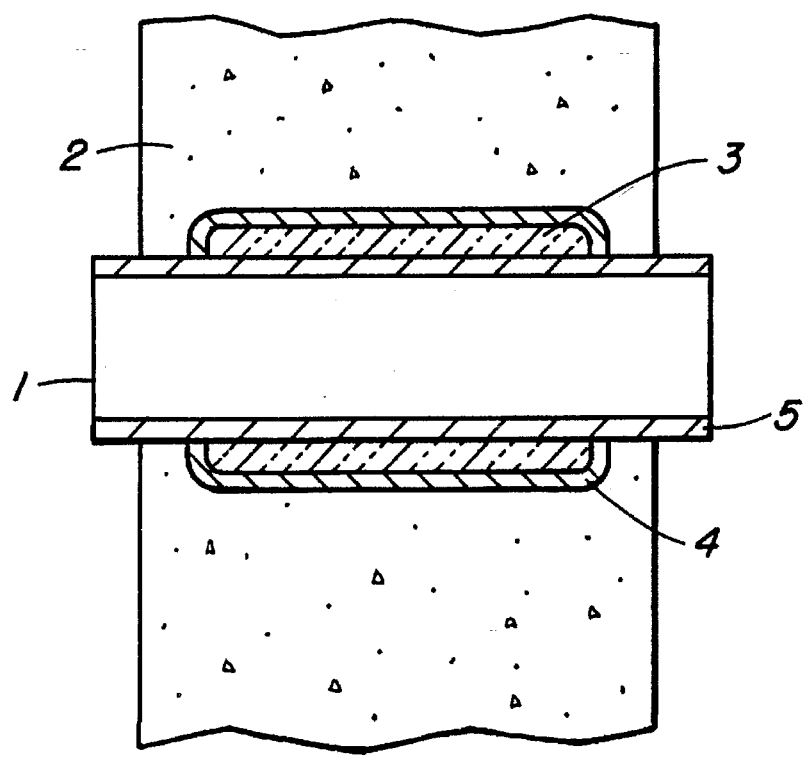
FIG. 1 is a side view of a basic conduit surrounded with intumescent material that is sealed within a water and water vapour impervious membrane barrier and cast in place within a concrete wall.

In FIG. 1 a conduit 1 of fusible material is cast in place within a concrete wall 2. The conduit has a surrounding layer of intumescent material 3, held in place by a membrane 4 that is water impermeable. A preferred material for such membrane is a chlorinated or butyl rubber coating that is installed as a liquid and allowed to harden. This may be done by temporarily capping one end and dipping the conduit 1, with the intumescent material fixed in place centrally, into liquid rubber. The impermeable barrier may also be formed by wrapping the intumescent in a sheet of membrane material that can be fused into a sealed state by applying heat.

The ends 5 of the conduit 1 are circular and square-cut to allow them to be coupled as male components into an exterior female coupling 6 attached to exterior conduit 7.

Figure 2:
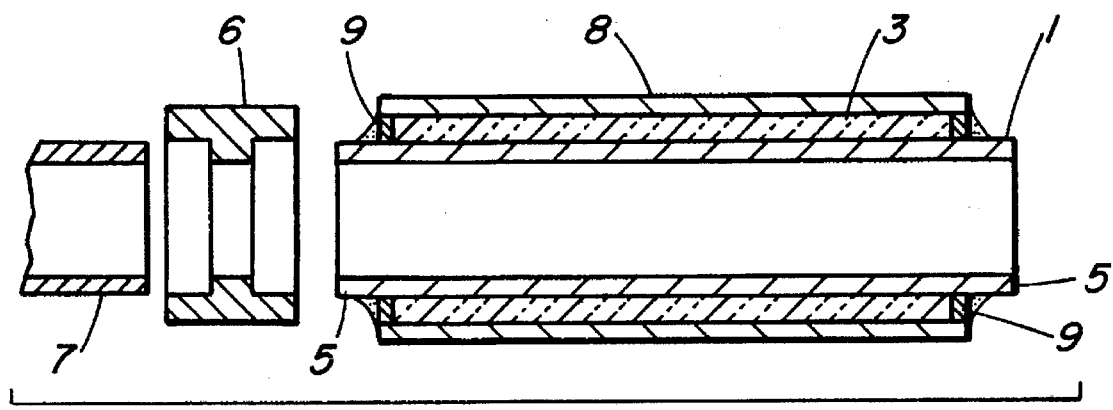
FIG. 2 is a side view of a conduit wrapped in intumescent material that is contained within a surrounding, non-expandable sleeve that is sealed around the annular openings at the ends.

In FIG. 2 the intumescent material 3 surrounding the conduit 1 is, in turn, encased within a sleeve 8 sealed at its ends by silicone rubber caulking 9. The sleeve 8 may be metal or plastic that is moisture impermeable and non-expandable under conditions where the intumescent material 3 expands due to heat originating within the conduit 1.

Figure 2A:
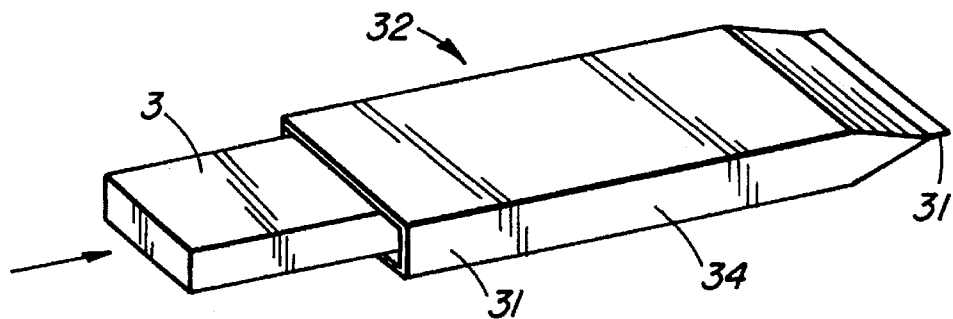
FIG. 2A is a perspective view of intumescent material being inserted into a sleeve of barrier film.

In FIG. 2A, the intumescent 3 is shown being slid into a flexible sleeve 34 of barrier-film that has a low permeability to water and water vapour. A suitable material for the sleeve 34 is polypropylene, particularly metallized polypropylene. Once the intumescent 3 is inside the sleeve 34, the ends 31 of the sleeve 30 may be sealed shut to create an effective barrier against the transfer of water either into or out of the intumescent material 3.

Figure 2B:
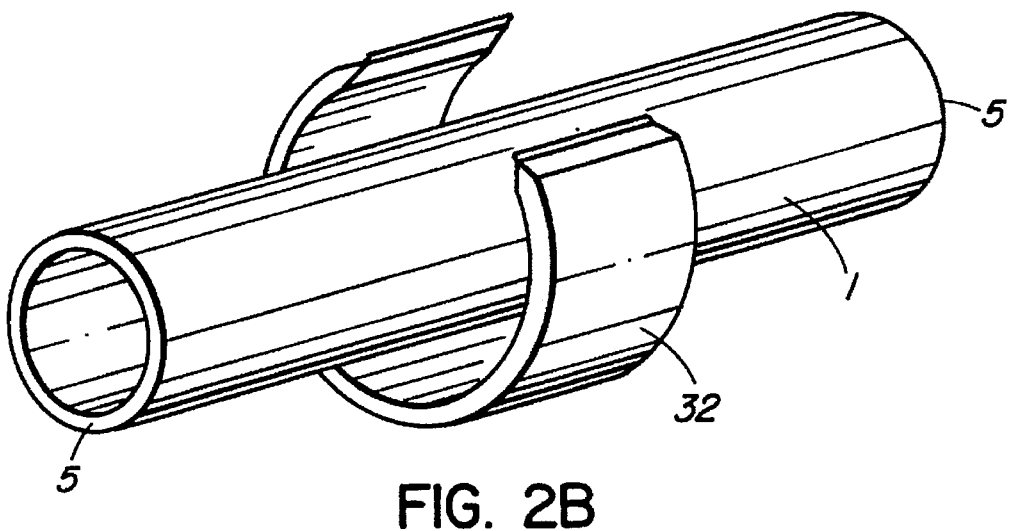
FIG. 2B is a perspective view of the wrapped intumescent of FIG. 2A being bent around a conduit section.

In FIG. 2B, the wrapped intumescent 32, may be bent around a conduit section 1, about its central portion. By reason of the loose fit of the sleeve 34, the wrapped intumescent 32 is readily pliable.

Figure 2C:
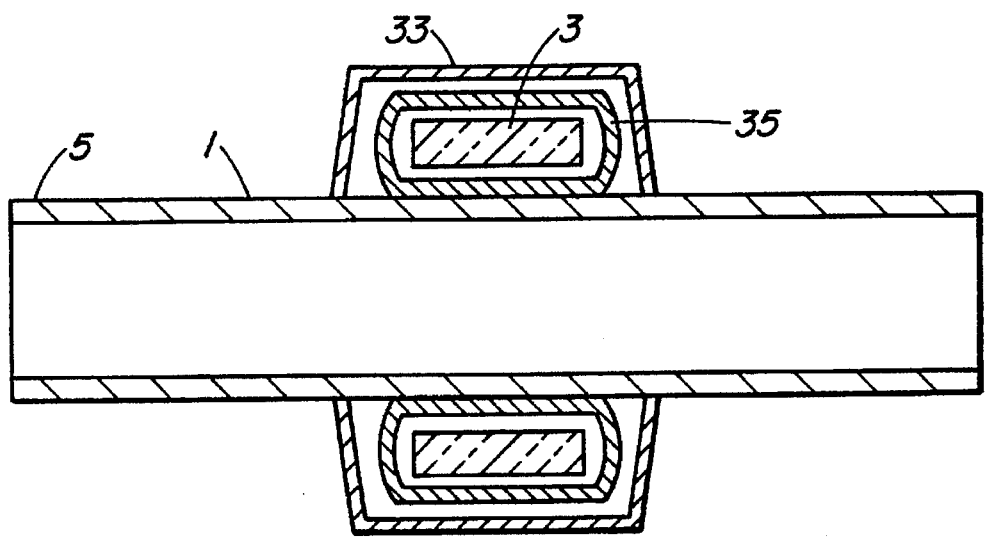
FIG. 2C is a cross-section of the conduit section of FIG. 2B with the intumescent material in place.

In FIG. 2C the conduit section 1, wrapped as in FIG. 2B, has a galvanized sleeve 33 fastened around it to protect the film 35, and contain the intumescent 3 when it expands under heat.

Figure 3:
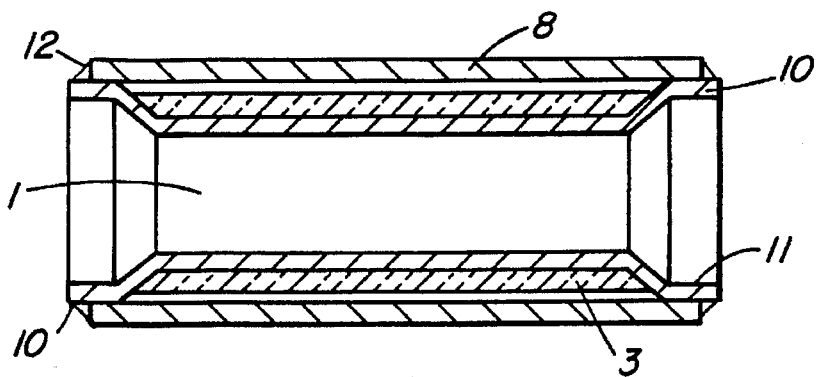
FIG. 3 is an alternate variant of FIG. 2 wherein the conduit ends are provided with enlarged collars that define female couplings.

In FIG. 3, the ends of conduit 1 carry enlarged collars 10 that provide an interior female coupling surfaces 11. The intumescent material 3 is wrapped around the conduit 1 centrally, between the collars 10. The outside diameter of the intumescent material 3 does not exceed the diameter of the collars 10.

A sleeve 8 extends between the collars 10, sealing the intumescent material 3 within the annular space between the sleeve 8 and conduit 1. An adhesive 12 ensures that the seal at this joint is water impermeable.

Figure 4:
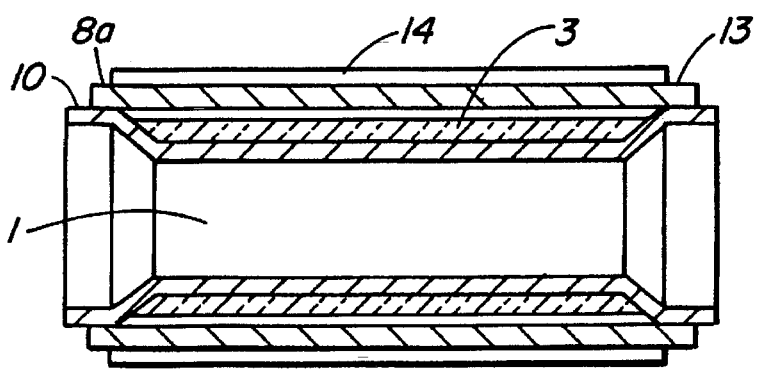
FIG. 4 is a further embellished version of FIG. 3 wherein the outer sleeve is a composite of an inner sleeve of weldable plastic material, and outer sleeve portion made of metal.

In FIG. 4, the sleeve 8a is composite, having an inner sleeve 13 of material that can be solvent or heat welded to the collars 10, and an outer sleeve portion 14 of galvanized iron. The ends of the inner sleeve 13 are welded to the collars 10 to provide a hermetic seal. This inner sleeve 13 may be of relatively thin material as the outer sleeve portion 14 provides the strength to render the combination non-expandable. Since the inner sleeve 13 provides the hermetic seal, the outer sleeve portion 14 may be formed with a longitudinal rolled seam that need not be vapour impenetrable.

Figure 5:
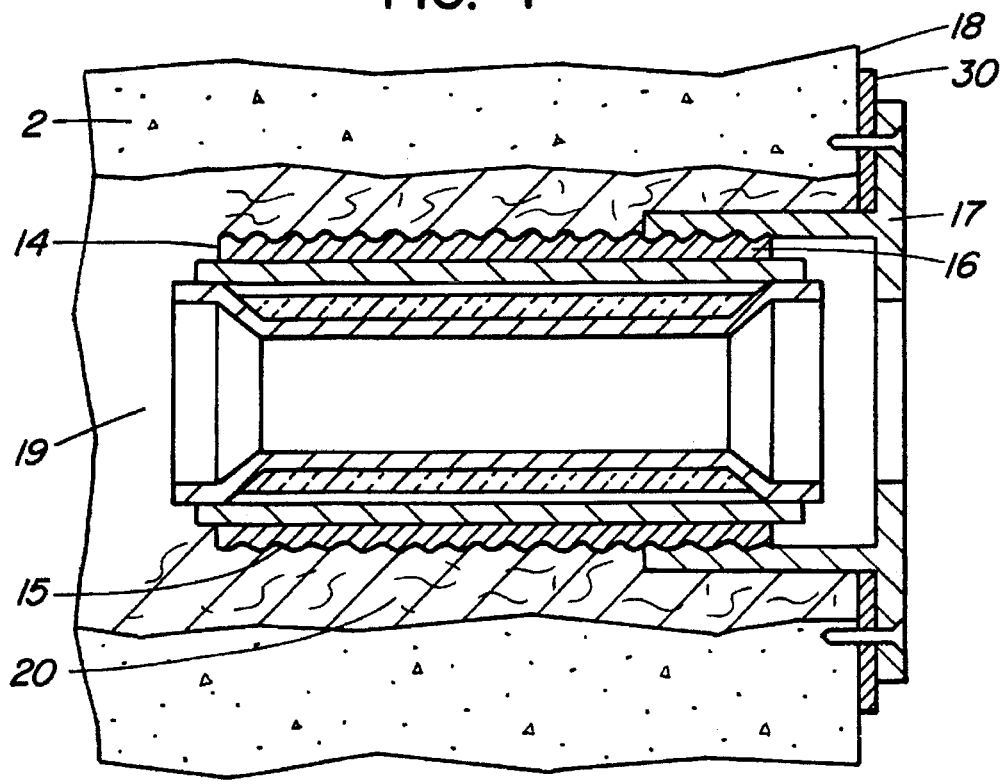
FIG. 5 is a depiction of the embodiment of FIG. 4 wherein the outer sleeve is threaded and the conduit is mounted inside a penetration through a wall by a threaded flange that engages with the sleeve.

In FIG. 5, the outer sleeve portion 14 has threading 15 rolled into its outside surface. This threading 15 engages with complementary threading 16 on a flange plate 17 that is fastened to the exterior surface 18 of a wall 2. The conduit assembly is thereby supported within a penetration 19 through the wall 2 by the flange plate 17.

The annular gap between the conduit assembly and the inside surface of the penetration 19 may be filled with conventional firestop packing 20 such as mineral fibre backing and/or silicone sealant. Further, a firestop gasket 30 may be positioned between the flange plate 17 and the wall surface 18.

While the threading 15 is shown as being rolled into the outer sleeve portion 14, it may equally be molded into a one-piece sleeve 8 as shown in FIGS. 2 or 3. In both cases, those of FIG. 2 or FIG. 5, the threading 15 allows the conduit assembly to be positioned within the penetration 19, even to the extent of allowing partial protrusion of one end 5 beyond the wall 2. This condition is shown in FIG. 6.

Figure 6:
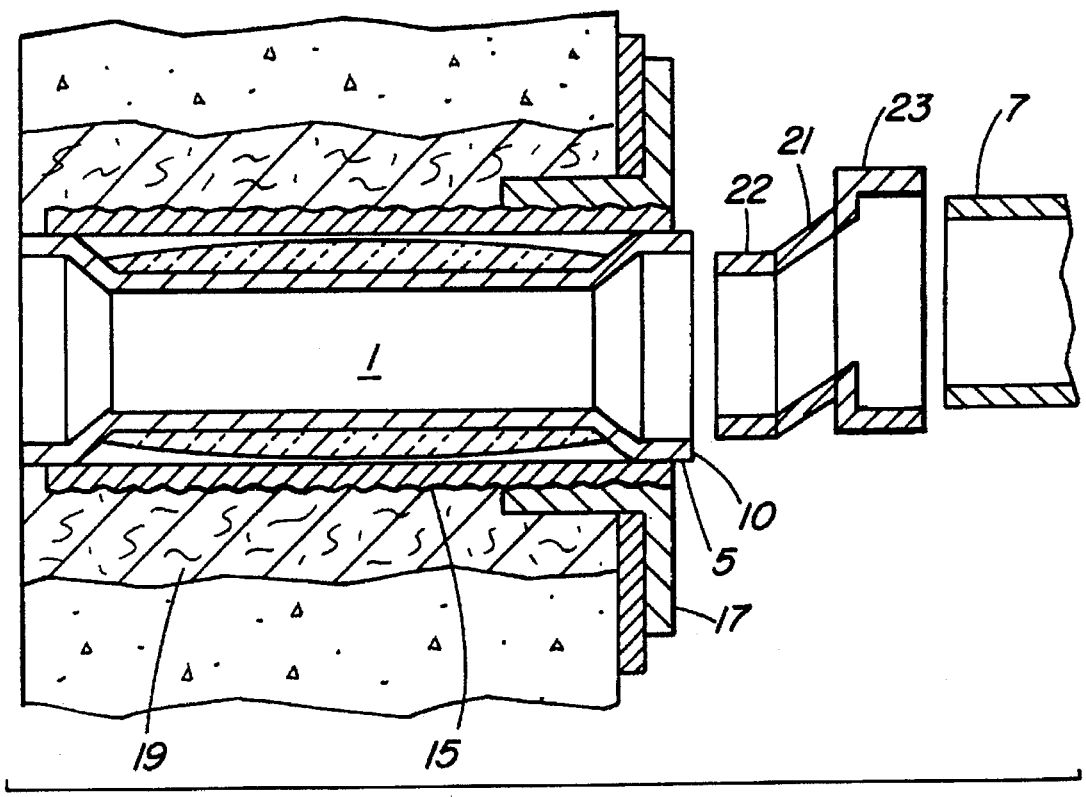
FIG. 6 shows exploded view of an off-set coupling adaptor about to be fitted to the end of the conduit of the invention.

In FIG. 6 the end 5 of the conduit 1 is assumed to have been positioned slightly out of alignment with an exterior conduit 7. An off-set coupling adaptor 21 having a male coupling 22 on one end engages with the collar 10 of the conduit 1. The other female end 23 of the adaptor 21 engages with the external conduit 7.

Figure 7:
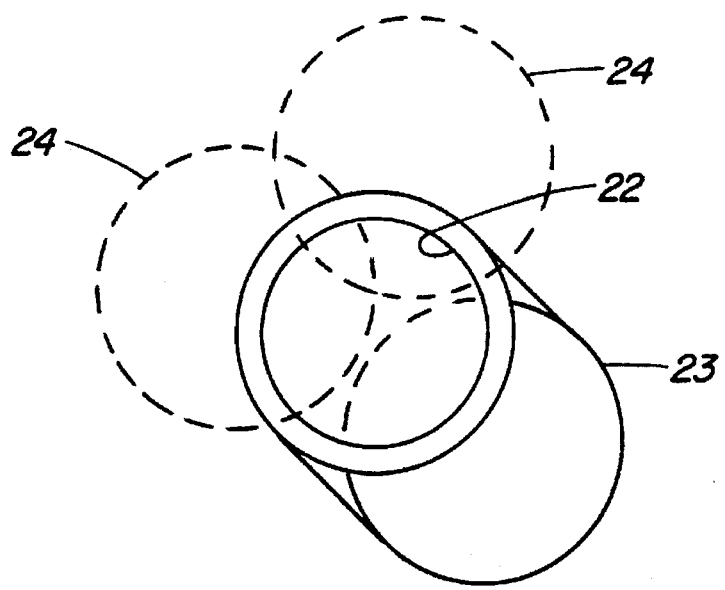
FIG. 7 shows the range of off-set positions that the off-set coupling adaptor may accommodate.

Because the male coupling 22 is circular, the female coupling 23 and adaptor 21 may be swung concentrically to assume a number of off-set positions 24, as shown in FIG. 7. This allows some degree of misalignment between the conduit 1 and external conduit 7 to exist without having to reposition the flange plate 17 or enlarge the penetration 19.

Figure 8:
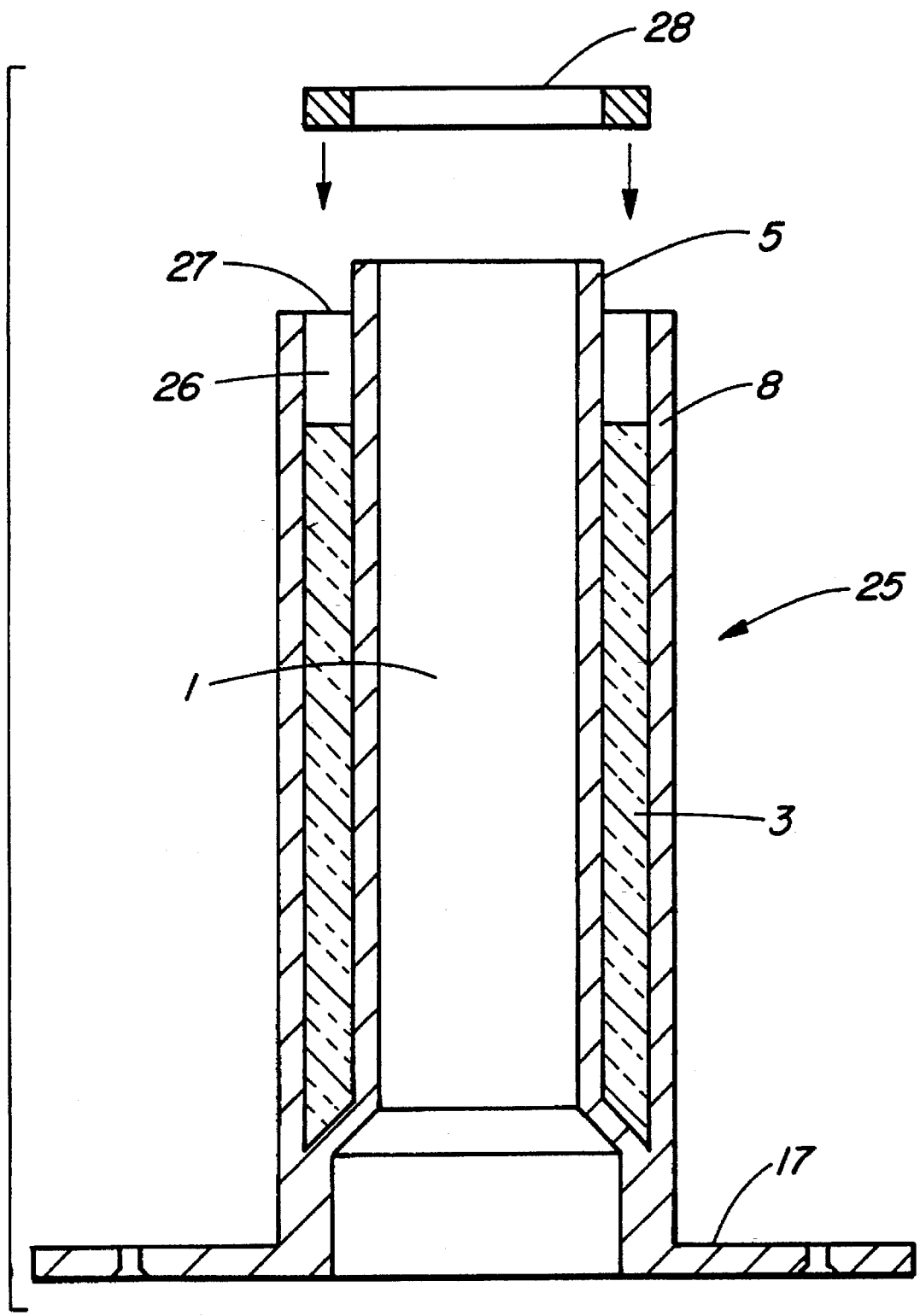
FIG. 8 shows an exploded view of a single molded combined conduit, sleeve and flange with an annular cap positioned to seal-off the intumescent material contained therein.

In FIG. 8, a monolithic molded firestop insert 25 is shown incorporating the conduit 1, sleeve 8 and flange plate 17 as a single unit. The annular space inside 26 is filled with intumescent material 3. Once the intumescent material 3 is in place, the opening 27 is closed with a cap 28. This cap 28 is in the form of a disk that may be welded in place in the annular opening 27 to provide a water impenetrable seal.

The end 5 may then be fitted, if desired with a female to female coupling (not shown) to allow it to be connected to exterior conduit 27. This may be provided with the unit 25, or added at the job site.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property is claimed as follows:

1. A collapsible length of firestop conduit made of fusible material, having two ends which are coupleable to other lengths of external conduit, said firestop conduit being provided between its ends around its outer surface with a layer of intumescent material to collapse the conduit when the conduit is heated to a fusible temperature, said intumescent material being totally contained by and enclosed within a substantially water and water vapour impermeable barrier that serves to limit passage of water and water vapour into or out of the intumescent material, said impermeable barrier being in the form of an entirely encircling flexible sleeve of water and water vapour barrier film.

2. A firestop conduit as in claim 1 where the film is a metallized polymeric plastic.

3. A firestop conduit as in claim 1 wherein the film is polypropylene.

4. Intumescent material for application to the exterior surface of a conduit made of fusible material, the intumescent material being in the form of a wrappable strip and being contained by and entirely within a substantially water and water vapour impermeable barrier that serves to limit the passage of water and water vapour into or out of the intumescent material, said barrier being a barrier film in the form of a flexible sleeve which wrapped and sealed around the intumescent material.

5. An intumescent material as in claim 4 wherein the barrier film is composed of metallized polymer plastic.

6. An intumescent material as in claim 5 wherein the polymeric plastic ts polypropylene.

* * * * *